United States Patent [19]
Leiber

[11] 4,192,557
[45] Mar. 11, 1980

[54] PNEUMATIC-HYDRAULIC BRAKE SYSTEM FOR VEHICLES

[75] Inventor: Heinz Leiber, Leimen, Fed. Rep. of Germany

[73] Assignee: Robert Bosch GmbH, Stuttgart, Fed. Rep. of Germany

[21] Appl. No.: 914,632

[22] Filed: Jun. 12, 1978

[30] Foreign Application Priority Data

Jun. 14, 1977 [DE] Fed. Rep. of Germany ....... 2726640

[51] Int. Cl.$^2$ ............................................. B60T 8/04
[52] U.S. Cl. ................................ 303/114; 188/181 A
[58] Field of Search .................... 188/181 A; 303/113–115, 118, 119, 84 A

[56] References Cited

U.S. PATENT DOCUMENTS

| 3,480,335 | 11/1969 | Inada | 303/115 |
| 3,523,713 | 8/1970 | Okamoto et al. | 303/115 |
| 3,826,542 | 7/1974 | Peruglia | 303/119 |
| 3,836,206 | 9/1974 | Leiber | 303/84 A X |

Primary Examiner—Duane A. Reger
Attorney, Agent, or Firm—Edwin E. Greigg

[57] ABSTRACT

A pneumatic-hydraulic brake system for vehicles having at least one pressure modulator used to supply a group of hydraulic wheel cylinders in combination with an anti-locking device. The pressure modulator is included in both the pneumatic and the hydraulic circuits of the system. For effecting anti-locking pressure modulation, at least one multiple-position air valve is included in the pneumatic circuit and at least one hydraulic valve in the hydraulic circuit.

10 Claims, 6 Drawing Figures

PNEUMATIC-HYDRAULIC BRAKE SYSTEM FOR VEHICLES

BACKGROUND OF THE INVENTION

Brake systems using compressed air as the transmission medium are widely popular. In these systems, a multiple-circuit brake valve is in most cases actuated by the brake pedal. The pressure is proportional to the force exerted on the brake pedal and is transmitted to so-called boosters or preload cylinders. It is customary to utilize one preload cylinder per brake circuit or also per axle. Such an arrangement consists, for example, of two brake valves and two preload cylinders and can be combined into one unit. In a two-circuit brake unit, the hydraulically and compressed-air actuated pistons are connected in series in a so-called tandem arrangement.

In these systems, anti-lock devices are also utilized. In systems having a so-called separate structure, i.e., a structure where the brake valve and the pressure cylinder are not spatially combined, one pressure cylinder is used for each control conduit. The anti-lock servo member is inserted in the connecting line to the brake valve. The servo member is actuated by an electronic circuit and serves to regulate the pressure in the pressure cylinder. The corresponding pressure level in the hydraulic brake circuit corresponds to the pressure transmitted.

The above described methods for solving the problem in the art represent a not inconsiderable expenditure in apparatus technology, especially when considering the additional measure of providing antilock means. The pressure cylinder combination must be of a correspondingly large dimension so that an appropriate brake pressure is produced even in case of poorly adjusted brakes. These systems, however, are disadvantageous if the corresponding brake circuit exhibits poor air-bleed. In such a case, the full brake pressure will, in most instances, no longer be attained. Without an additional warning means, the driver cannot be made aware of this impairment in functioning. Since most of the braking operations take place in the partial braking zone, the faulty functioning becomes noticeable only in case of full braking due to the lower braking effect, which can then represent a dangerous situation.

OBJECT, SUMMARY AND ADVANTAGES OF THE INVENTION

It is a principal object of the present invention to provide the existing state-of-the-art with an improved pneumatic-hydraulic brake system which can effect braking in spite of vapor lock, or small leaks in one of the hydraulic brake circuits.

This object is achieved by a pneumatic-hydraulic braking system utilizing a pneumatic-hydraulic pressure modulator combined with an anti-locking device. For the anti-lock pressure modulation, valves are employed, a portion of which, upon attainment of the end position of a pneumatic piston in the pressure modulator, can seal off the hydraulic brake lines connected downstream thereof in order to provide for the replenishing of the hydraulic pressure from the reservoir.

In this way, it is still possible to effect braking in spite of vapor lock or in spite of a small leak in one of the hydraulic brake circuits. In the extreme case, it is even possible to execute high-pressure air braking.

The brake system of this invention has the advantage, in contrast to the above prior art, that poorly air-bled brake circuit, or a brake circuit which is ineffective due to vapor lock, can be immediately reactivated.

It is furthermore advantageous that only a single modulator is required per vehicle axle or per brake group.

Furthermore, it is advantageous that the arrangement can also operate as a high-pressure air pump so that a braking action can be carried out at increased air pressure when the hydraulic system has failed.

BRIEF DESCRIPTION OF THE DRAWINGS

Several embodiments of the invention are illustrated in the drawings and will be described in greater detail in the following disclosure. In the drawings.

PRIOR ART

Figure 1:
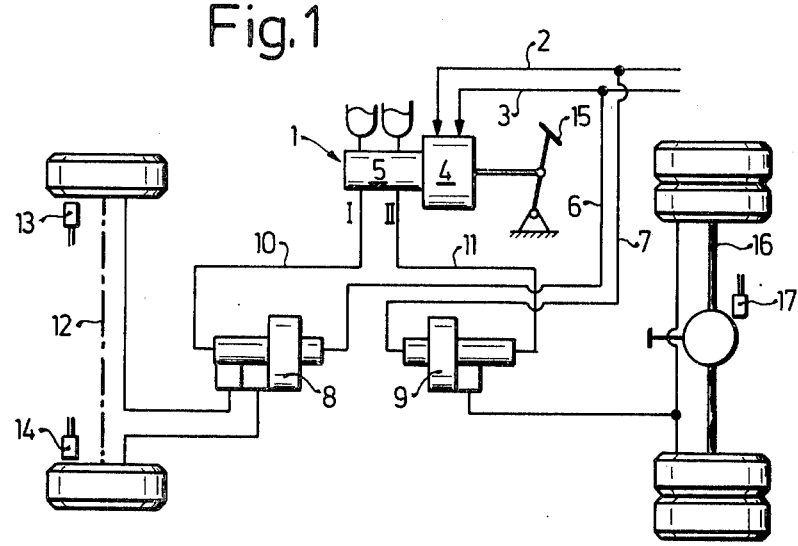
FIG. 1 shows an arrangement constituting a combined construction pertaining to the prior art.

An external-force brake system is shown in FIG. 1. The system comprises a brake pedal 15 capable of operating a hydraulic-pneumatic booster 1 with a pneumatic piston 4 supplied by two feed lines 2 and 3 and with a tandem arranged hydraulic master cylinder 5 to supply two brake circuits I and II. Two air conduits 6 and 7 branch off from the air feed lines 3 and 2, respectively, to respective pressure modulators 8 and 9. One of the modulators is associated with brake circuit I and the other is associated with the brake circuit II. Two hydraulic lines 10 and 11 extend from the tandem master cylinder 5 to the pressure modulators 8 and 9.

The two pressure modulators 8 and 9 are fashioned differently for a front axle brake than for a rear axle brake, or brakes in the case of dual or multiple rear axles. The brake system for the front axle has two sensors 13 and 14, one for each wheel, and a brake cylinder (not shown) which can have differing pressures applied thereto. The rear axle 16 has only one sensor 17 and two brake cylinders (not shown) (two wheels per side as shown) supplied with the same pressure. With such an arrangement, one refers to a 2-channel control for the front axle and a 1-channel control for the rear axle. However, it is also known to be able to control the rear axle individually, following the example for the front axle. Such a type of construction is conventional.

DESCRIPTION OF THE PREFERRED EMBODIMENTS

Figure 2:
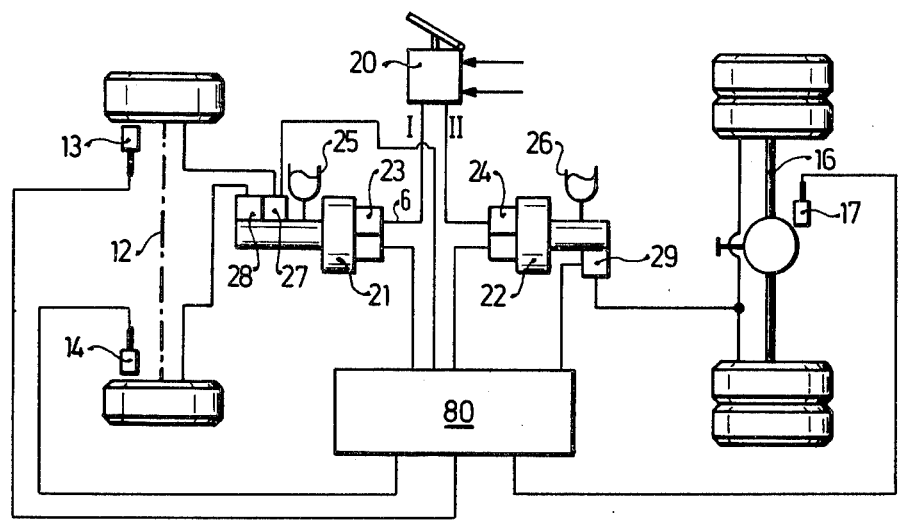
FIG. 2 shows an embodiment according to this invention with a so-called separate mode of construction.

FIG. 2 shows a similar embodiment to FIG. 1 but with the system of this invention in a brake of separate construction.

A pneumatic two-circuit brake valve 20 supplies two modulators 21 and 22 with compressed air. Each modulator 21 and 22 comprises, for example, a 3/2-way solenoid valve 23 and 24, respectively, for the compressed air and one hydraulic replenishing tank 25 and 26, respectively. The modulator 21 furthermore comprises two 2/2-way solenoid valves 27 and 28 for a 2-channel control, and the modulator 22 has a 2/2-way solenoid valve 29 for a 1-channel control. The remaining reference numerals have been derived from the illustration of FIG. 1.

Figure 3:
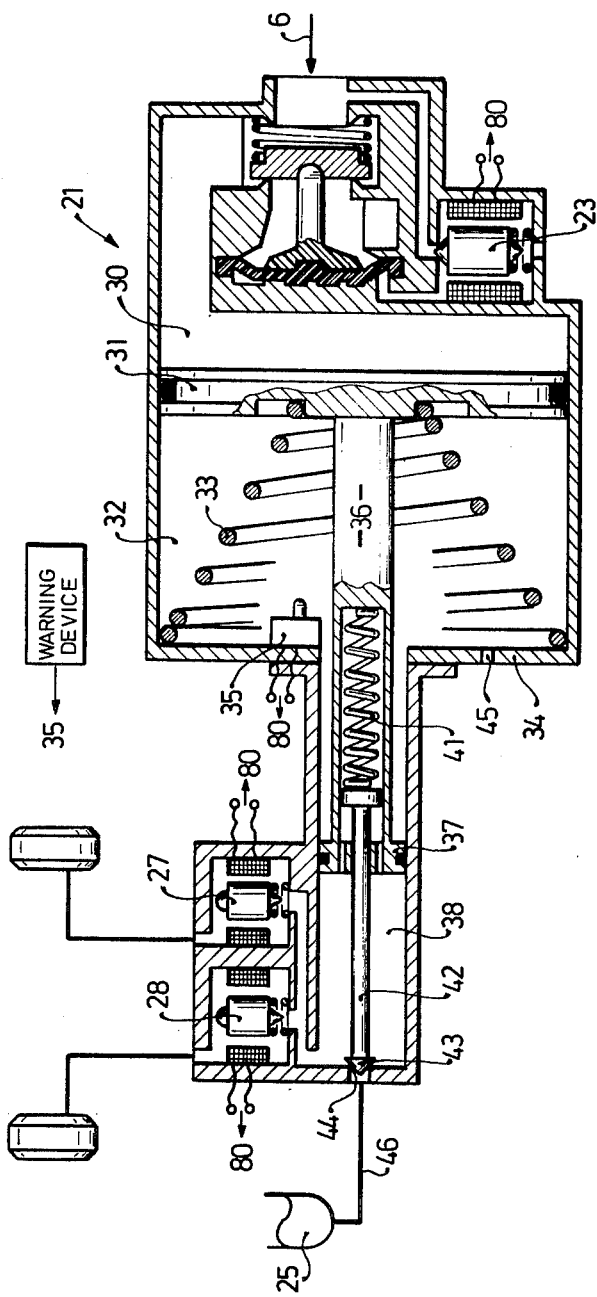
FIG. 3 shows a pressure modulator used in the embodiment according to FIG. 2, in a sectional view.

The pressure modulator 21 for the front-axle 2-channel control is shown in a sectional view in FIG. 3. It can be seen that the reservoir line 6 leads to the 3/2-way solenoid valve 23 which monitors the supply of compressed air to a pressure chamber 30 in the modulator 21. The pressure chamber 30 is limited by a modulator piston 31 which seals off, on its other side, an external air chamber 32, which is exposed to external air by the bore 45. A restoring spring 33 for the piston 31 is arranged in this chamber 32 and the latter further includes a limit switch 35 on one end wall 34.

A piston rod 36 connected to the modulator piston 31 is fashioned in its forward portion 37 as a hydraulic piston which partly defines a hydraulic chamber 38. This chamber 38 is in communication, on the one hand, with the replenishing tank 25 and, on the other hand, with the two 2/2-way solenoid valves 28 and 27 arranged in parallel, side-by-side relationship. The hydraulic chamber 38 has a small dead volume in the brake-operating end position of piston 37. Furthermore, the conduits from there to valves 28 and 27 are very short.

The hydraulic piston 37 has an axial bore and receives a spring 41 and a plunger 42, the latter carrying at its other end a closing member 43 for a valve 43/44, the valve seat 44 of which is arranged at the mouth of a connecting conduit to the replenishing tank 25. The magnets of the solenoid valves 23, 28, and 27 are electrically connected to the sensors 13 and 14 by way of an electronic control unit 80 (FIG. 2).

The electronic control unit 80 contains a wheel speed conditioning circuit and a logic circuit which transforms the speed and acceleration signals in such a way, that when the wheel tends to stop the respective solenoid valve is activated in order to reduce the pressure and that when the wheel reaccelerates the pressure is maintained at a constant value and subsequently increased by means of a pulsed control.

MODE OF OPERATION

During braking, the 3/2-way solenoid valve 23 allows compressed air to pass from brake valve 20 into the pressure chamber 30. The modulator piston 31 is moved against the force of spring 33; the valve 43/44 leading to the replenishing tank 25 is closed; and a hydraulic pressure medium passes via the two 2/2-way solenoid valves 28 and 27 to the front axle brake cylinders.

When the front wheel brakes lock, the three solenoid valves 23, 28, 27 are switched over along the lines of anti-lock action with the aid of the electronic switching device 80. By means of the 2-channel control feature, each brake cylinder of the front axle 12 can be regulated separately. In this way, only one pressure cylinder 21 is required for the individual control of the wheels of axle 12.

Upon the occurrence of a vapor lock in the brake circuit I the modulator piston 31 travels up to the end wall 34 and operates the limit switch 35. This switch 35 is switched over to actuate a device indicating a warning. Furthermore, the switch 35 is used in conjunction with the electronic circuit device for replenishing a defective hydraulic brake circuit.

For this procedure, the two solenoid valves 28 and 27 in the hydraulic circuit are switched to a holding function, and the 3/2-way solenoid valve 23 present in the compressed-air line is switched for pressure reduction. As a consequence thereof, the restoring spring 33 resets the piston 31. After release of the relief bore 44, brake fluid is taken in A renewed application of pressure to the compressed-air piston 31 results in movement of the piston and the replenishing of hydraulic medium in the brake circuit. In this case, the solenoid valves 28 and 27 in the hydraulic circuit are then opened again. In the critical case, for example if there is no longer brake fluid in the fluid tank, this arrangement, due to the small dead volumes, can even operate as a high-pressure compressed-air pump. This pumping effect is possible, because when the brake pedal moves backward, the 2/2-way solenoid valves have closed off the brake lines to the brake cylinders. The dead space between the master brake cylinder piston in the end position and the switching valves must, in this connection, be small in order to attain a corresponding pressure level.

The modulator 22 of the rear axle 16, which is likewise connected to the electronic control device 80, operates in a similar manner.

Figure 4:
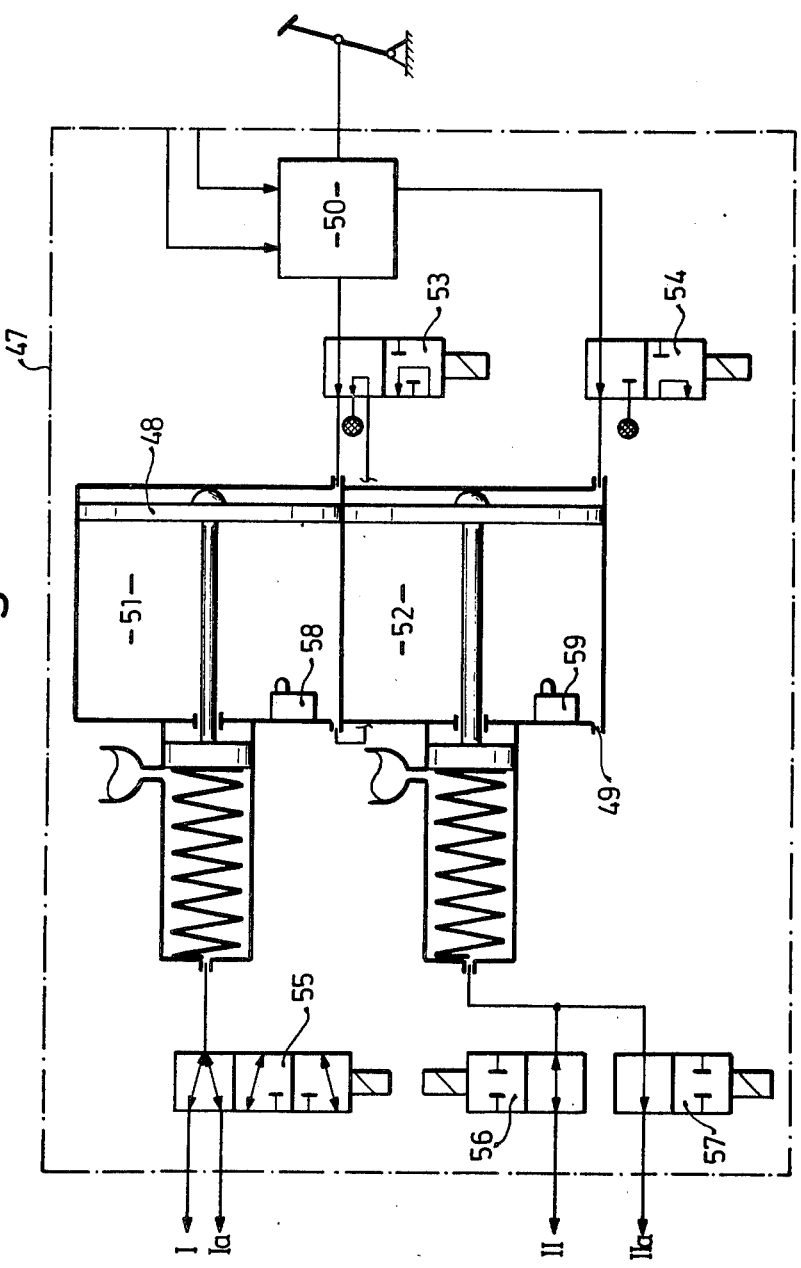
FIG. 4 shows a combination of two pressure modulators in a sectional view.

FIG. 4 shows a brake system wherein a brake valve 50 with two preload-presure modulators 51 and 52 and anti-lock air and/or hydraulic valves 53, 54, 55, 56, and 57 are combined into a structural unit 47. In the preload-pressure modulator 51, the pressure applied to the front side of the compressed-air piston 48 can be lowered by switching the valve 53 and applying the pressure to the rear side of the piston. In the other pressure modulator 52, the compressed air is bled to the outside through the bleed bore 49 to lower the pressure, as is conventional. Both preload-pressure modulators 51 and 52 possess a limit switch 58 and 59, respectively. The mode of operation of this device is similar to the one described above.

Figure 5:
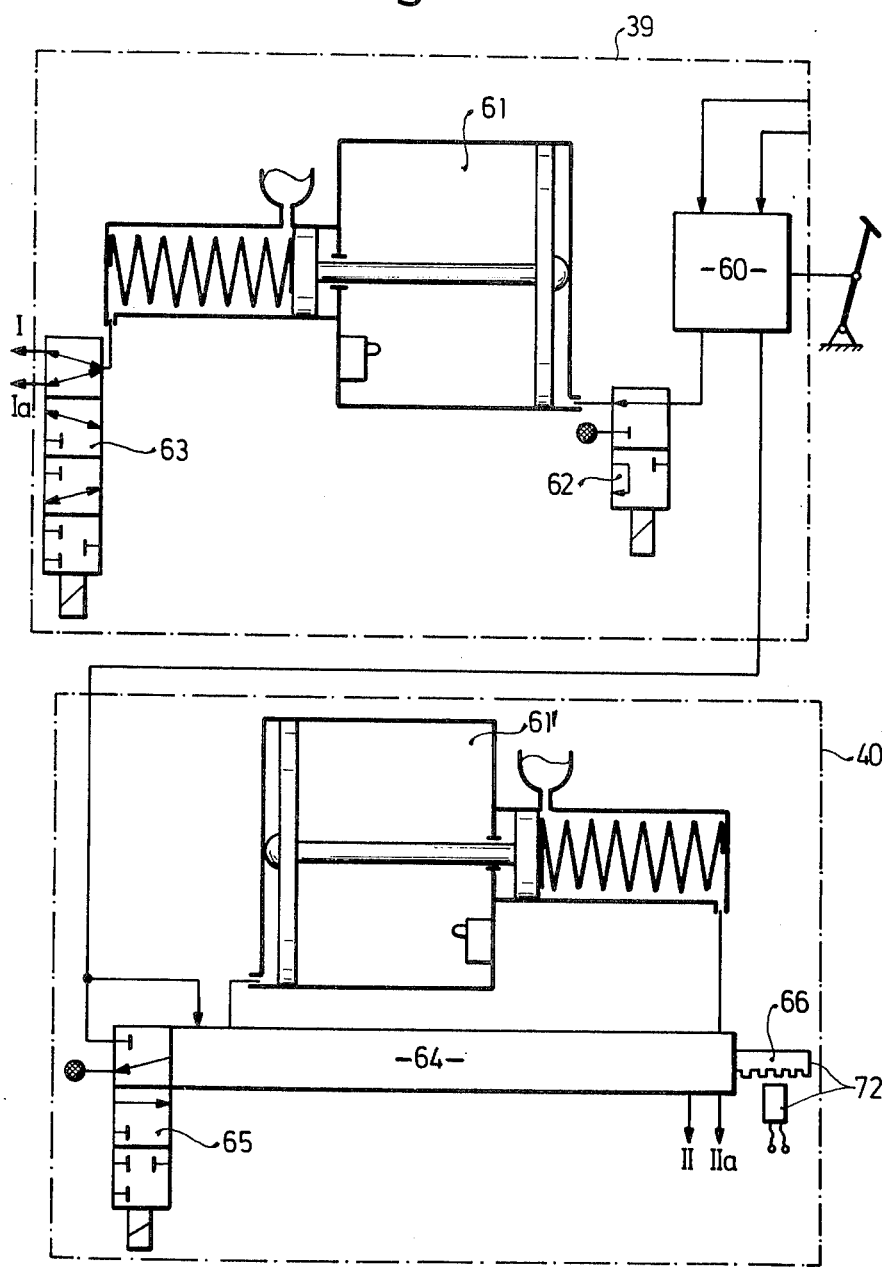
FIG. 5 shows a separate construction with a multiple-position valve.

FIG. 5 shows the same arrangement in principle, the so-called separate structure. According to this embodiment, there is included a unit 39 having a brake valve 60, a preload-pressure modulator 61, and antilock air or hydraulic valves 62 and 63. It is self-evident that this unit yields the pressure supply for the front axle, in contrast to the farther-removed rear axle. If the spacing between axles is very large, resulting in a correspondingly long hydraulic conduit, the throttle resistances in the hydraulic conduit will be too high, and this will result in a delayed application of pressure in case of the anti-lock function. From the viewpoint of control technology, these disadvantages are eliminated by arranging a second unit 40 with a preload-pressure modulator 61' in the proximity of the axle. Possible anti-lock valves can be constituted by a combination of a compressed-air valve to regulate the compressed air on the primary side and, in the hydraulic circuit, the use of two-or multiple-position valves, as the one illustrated with reference numeral 64. In this multiple-position valve block, for example, a longitudinal slide means 66 is regulated to assume an appropriate position by means of a compressed-air-operated servo piston 71. For actuation purposes, a 3/3-way valve 65 is switched by the electronic circuit 80; the positional signal for the control of the position is derived from a position generator 72.

Figure 6:
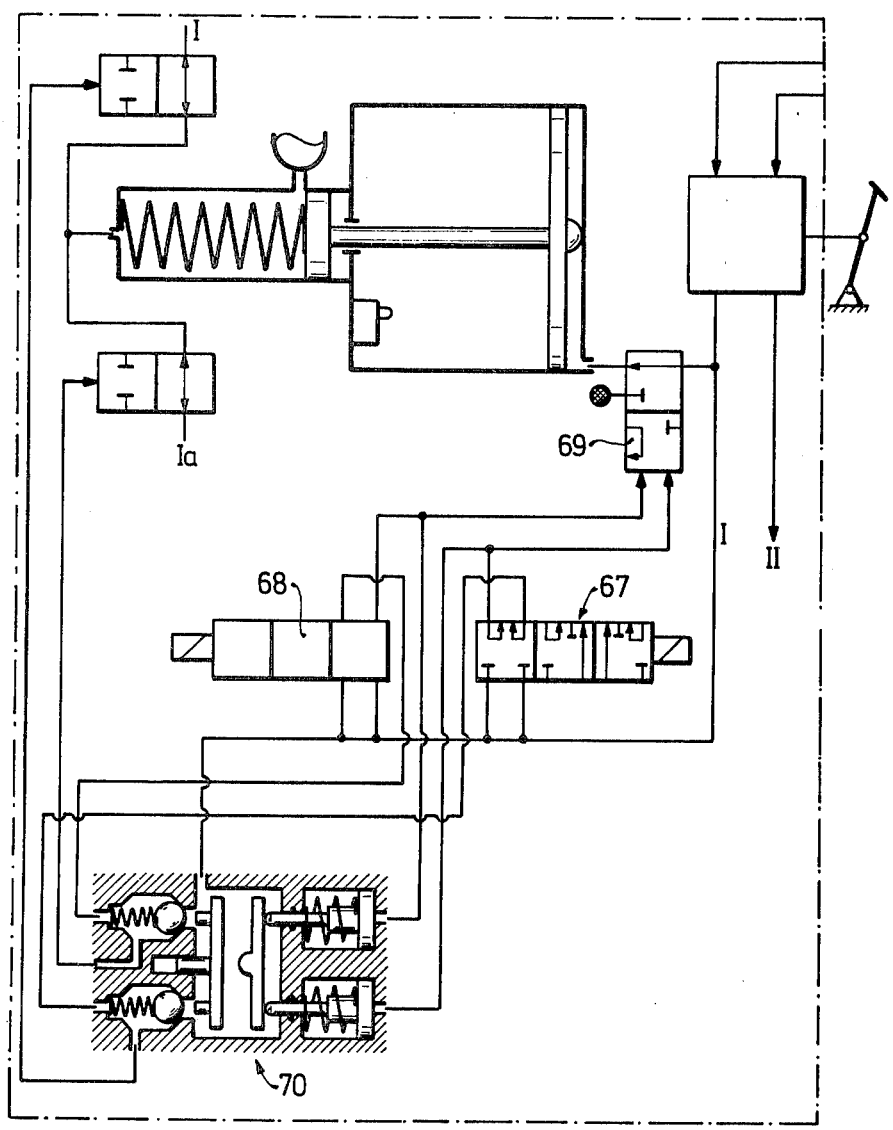
FIG. 6 shows another possible combination.

FIG. 6 provides a further combination possibility in the use of two magnetically operated three-position air or hydraulic valves 67 and 68 with six positions, which represent servo valves which control primary valves 69 and 70 in the compressed-air circuit and the hydraulic circuit. To employ the aforedescribed circuit for replenishing the hydraulic circuit, a two-way valve is required as the primary valve 70, which responds when both servo valves 67 and 68 are in switching position 3. By means of this switching position, the two-way primary valve 69 in the compressed-air circuit is switched to the closed position.

What is claimed is:

1. In a pneumatic-hydraulic brake system for vehicles having hydraulic wheel cylinders and a foot-operated brake valve, the improvement comprising:
    at least one pneumatic-hydraulic pressure modulator connected to the hydraulic wheel cylinders and to the brake valve, said brake valve controlling the application of operating air to the pressure modulator;
    at least one multiple-way air valve connecting the pressure modulator to the brake valve; and
    at least one hydraulic valve connecting the pressure modulator to the wheel cylinders, wherein the pressure modulator, the air valve and the hydraulic valve serve as an anti-lock device.

2. The brake system as defined in claim 1, wherein the air valve comprises a 3/2-way solenoid valve, and wherein the system includes two hydraulic valves, each comprising a 2/2-way solenoid valve.

3. The brake system as defined in claim 1, wherein the pressure modulator includes a pneumatic piston, the system further comprising:
    a limit switch mounted within the pressure modulator in the path of travel of the pneumatic piston toward its full braking position.

4. The brake system as defined in claim 3, wherein the system includes two hydraulic valves, said system further comprising:
    warning means connected to the limit switch; and
    an electronic control device connected to the limit switch and to the hydraulic valves.

5. The brake system as defined in claim 3, wherein replenishment of a defective brake circuit can be initiated by the limit switch.

6. The brake system as defined in claim 1, wherein the air valve is an integral part of the pressure modulator and is connected to the brake valve.

7. The brake system as defined in claim 1, wherein the system includes: two pressure modulators, one for the front vehicle axle and the other for the other vehicle axles; at least two multiple-way air valves, one for each modulator; and at least two hydraulic valves, one for each modulator, wherein the two modulators are arranged separately, and wherein the front axle modulator is an integral part of the brake valve.

8. The brake system as defined in claim 7, wherein the air valve and hydraulic valve of the modulator for the other vehicle axles are combined into a multiple-position valve block.

9. The brake system as defined in claim 1, wherein the pressure modulator includes a hydraulic chamber, said hydraulic chamber including a small dead volume at the end of the brake actuation stroke.

10. The brake system as defined in claim 9, wherein the system includes two hydraulic valves, and wherein the conduits from the hydraulic chamber to the hydraulic valves are short.

* * * * *